US012562024B2

(12) United States Patent
Isgar

(10) Patent No.: US 12,562,024 B2
(45) Date of Patent: Feb. 24, 2026

(54) GAMING TICKER SYSTEM WITH AI FUNCTION

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 257 days.

(21) Appl. No.: 18/167,191

(22) Filed: Feb. 10, 2023

(65) Prior Publication Data

US 2023/0252848 A1 Aug. 10, 2023

Related U.S. Application Data

(60) Provisional application No. 63/308,764, filed on Feb. 10, 2022.

(51) Int. Cl.
*G07F 17/32* (2006.01)
*G06Q 50/34* (2012.01)

(52) U.S. Cl.
CPC ........... *G07F 17/323* (2013.01); *G06Q 50/34* (2013.01); *G07F 17/3237* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 2010/0121849 | A1 | 5/2010 | Goeldi | |
| 2015/0378587 | A1 | 12/2015 | Falaki et al. | |
| 2016/0080817 | A1 | 3/2016 | Chai et al. | |
| 2018/0124438 | A1 | 5/2018 | Barnett | |
| 2018/0285910 | A1 | 10/2018 | Klejin | |
| 2020/0234544 | A1* | 7/2020 | Joao | G07F 17/3237 |
| 2020/0294354 | A1* | 9/2020 | Joao | G07F 17/3288 |
| 2021/0118265 | A1* | 4/2021 | Joao | G07F 17/3288 |
| 2021/0264735 | A1* | 8/2021 | Joao | G07F 17/3241 |
| 2023/0024852 | A1* | 1/2023 | Joao | H04N 21/2585 |
| 2024/0087425 | A1* | 3/2024 | Darby | G07F 17/323 |
| 2024/0386783 | A1* | 11/2024 | Joao | G07F 17/3288 |

* cited by examiner

*Primary Examiner* — Ronald Laneau
(74) *Attorney, Agent, or Firm* — Schmeiser, Olsen & Watts LLP

(57) ABSTRACT

Described is a gaming ticker system. The system includes a gaming server having a memory storing various data. The various data may include user information, user gaming behavior, such as storing bets, amounts, teams and so forth. The system may also include a user computing device coupled to the server and a TV. The TV is configured to display a gaming ticker displaying interaction between the user computing devices on a gaming platform engaged with the gaming server. This may be accomplished while watching a program, such as a game, on the TV.

7 Claims, 7 Drawing Sheets

GAMING TICKER SYSTEM WITH AI FUNCTION

CROSS REFERENCE TO RELATED APPLICATION[S]

This application claims priority to U.S. Provisional Patent Application entitled "GAMING TICKER SYSTEM," Ser. No. 63/308,764, filed Feb. 10, 2022, the disclosure of which is hereby incorporated entirely herein by reference.

BACKGROUND OF THE INVENTION

Technical Field

This invention generally relates to gaming systems, and more particularly to a system for interaction on a gaming system that includes overlaying a TV program with a ticker showing gaming and betting interaction with the system on the ticker.

State of the Art

There is increasing amounts interaction of individuals on computing devices for purposes of gaming, such as sports betting. This can happen over phones engaging in gaming and interaction regarding the same and can happen during and in reference to programming broadcast over the television or streamed over the television through streaming TV and movie services. There lacks a system that allows for individuals to engage in gaming interaction that is also displayed on the TV screen as a ticker overlayed on the program being displayed and watched by individuals as a ticker on the screen that displays the interactions as individuals engage with the gaming platform. Additionally, there is lacking a system like this that can also collect and aggregate data and input from the individuals engaged in such a system.

Accordingly, what is needed is a system for gaming ticker system that overlays a ticker displaying gaming interaction over a program being displayed on a TV.

SUMMARY OF THE INVENTION

An embodiment includes a system for gaming interaction, the system comprising: a gaming server having a memory storing various sports betting data; and a user computing device coupled to the server; and a TV coupled to the server, wherein the server is programmed to: receive a signal that the user computing device and the TV have accessed the system and established a connection with the server; send for display on the TV, a gaming ticker displaying betting odds for at least one sports game; send for display on the user computing device, a betting interface corresponding to the betting odds displayed on the gaming ticker, the betting interface comprising input elements for placing a bet; receiving a bet from the user computing device in response to selection of the input elements and storing the bet; and sending for display on the gaming ticker an alert related to the bet placed through the user computing device.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a gaming ticker system that operates to allow individuals to engage in gaming interaction that also overlays the interaction on a TV program displayed on a TV. The system may include the use of a mobile application operating on a user computing device that may be a mobile computing device like a smartphone, a tablet, a wearable, and the like.

Figure 1A:
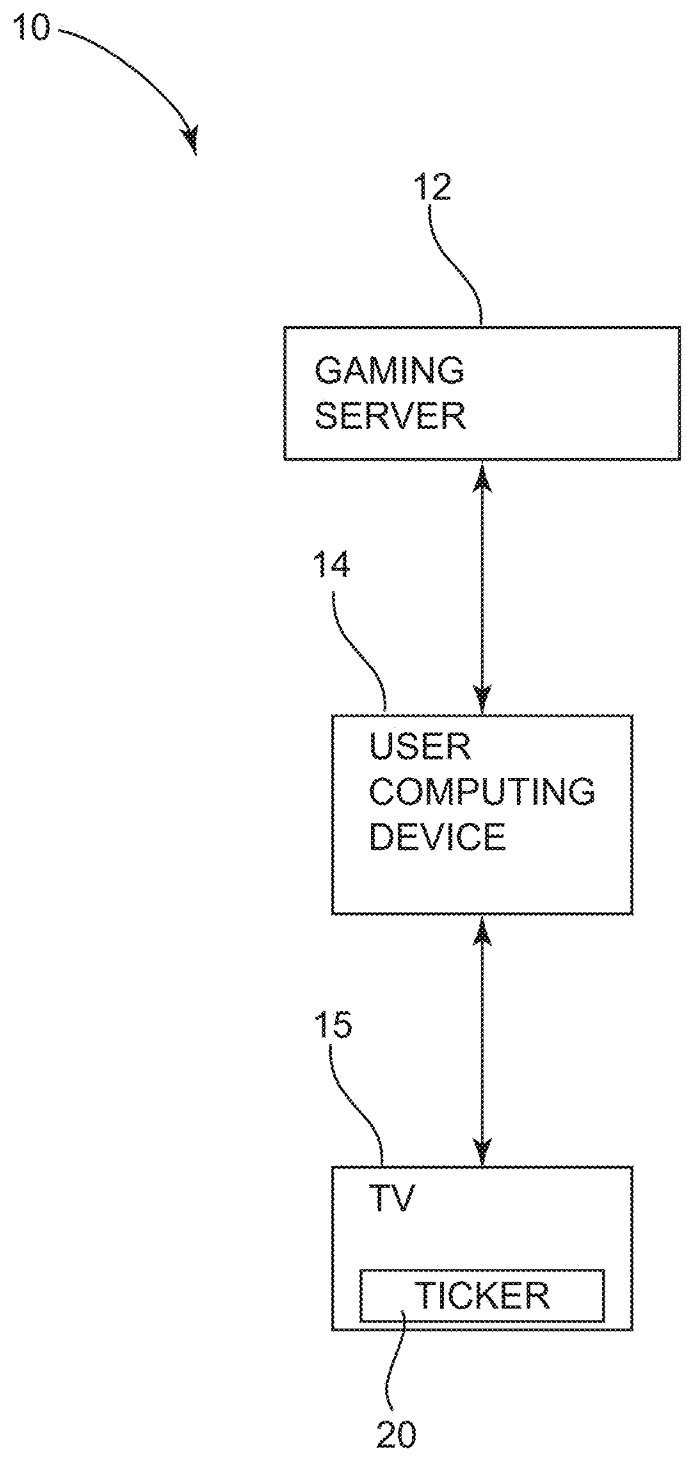
FIG. 1A is a diagrammatic view of a gaming ticker system according to an embodiment.
Figure 1B:
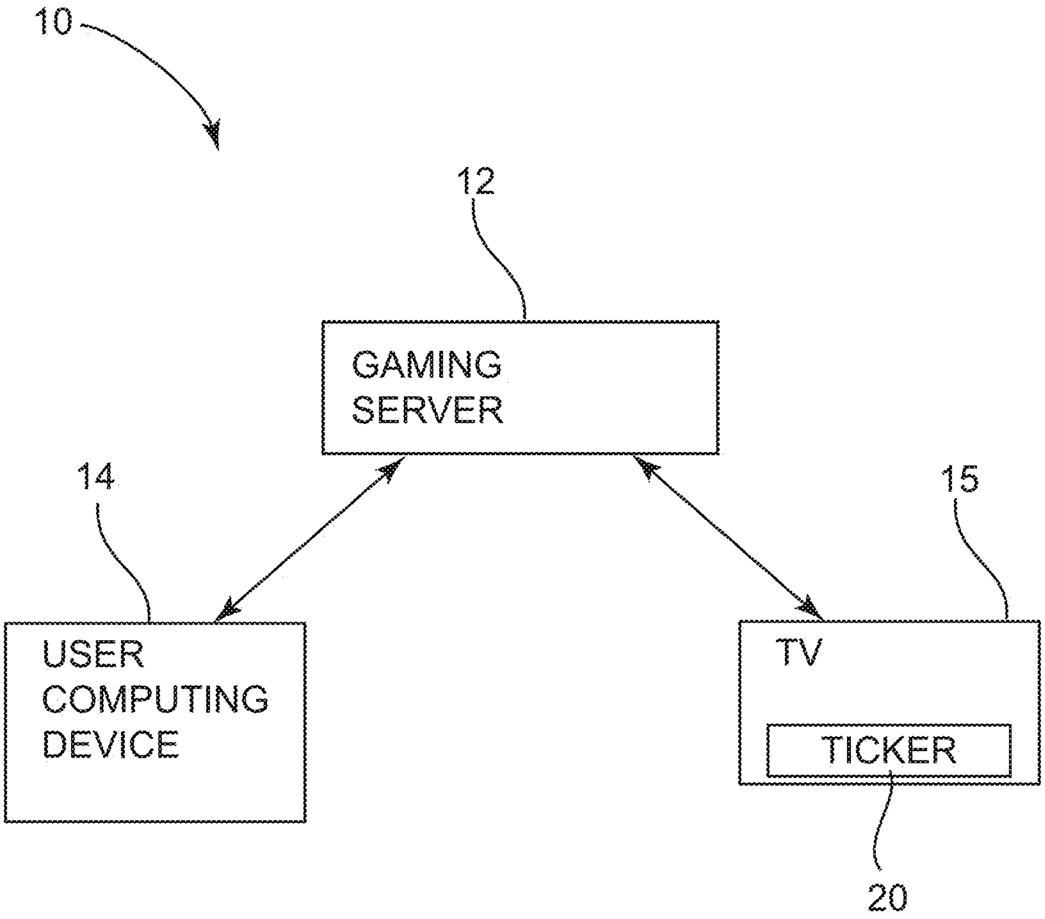
FIG. 1B is a diagrammatic view of another gaming ticker system according to an embodiment.

FIGS. 1A-1B show two embodiments of a gaming ticker system 10 for. FIG. 1A depicts an embodiment of a system 10 that may include a gaming server 12 coupled to a user computing device 14 that is coupled to a TV 15. This coupling of the user computing device 14 with the server 12 may be a network connection, such as a wireless connection through an Internet connection, a Wi-Fi connection, a Bluetooth connection or the like, wherein the user computing device 14 may communicate with and receive communication from the server 12. This coupling of the user computing device 14 and TV 15 may be a network connection, such as a wireless connection through an Internet connection, a Wi-Fi connection, a Bluetooth connection or the like to send and received communication from each other. The user computing devices 14 may include a desktop computer, a laptop, a tablet, a smartphone, wearable devices a vehicle-installed computing device and the like. The server 12, in some embodiments, may be a computer server or a cloud-based infrastructure architecture. The TV 15 may overlay a ticker 20 over the program being watched, such as a sporting event (see FIGS. 2-6) or any type of program wherein the ticker 20 displays interactions of the user computing device 14 on the TV 15.

FIG. 1B depicts an embodiment of a system 10 that may include a gaming server 12 coupled to a user computing device 14 and coupled to a TV 15. This coupling of the user computing device 14 and TV 15 with the server 12 may be a network connection, such as a wireless connection through an Internet connection, a Wi-Fi connection, a Bluetooth connection or the like, wherein the user computing device 14 may communicate with and receive communication from the server 12. The user computing device 14 may include a desktop computer, a laptop, a tablet, a smartphone, wearable devices a vehicle-installed computing device and the like. The server 12, in some embodiments, may be a computer server or a cloud-based infrastructure architecture. The TV 15 may overlay a ticker 20 over the program being watched, wherein the ticker 20 displays interactions of the user computing device 14 on the TV 15.

The server 12 may include a memory storing various data. The memory of the server 12 may store user information, bets made by users of the system, location information of the user when accessing the system 10 and so forth. Additionally, the server 12 may store anonymous poll data wherein the system 10 operates to send a poll question to users of the system and anonymously gathers the poll data for utilization by the system 10 or for providing to third-parties the collected and aggregated anonymous poll data.

Referring to FIGS. 2-6, embodiments of the system 10 may operate as part of a gaming system. Users engaged in a gaming system may be watching a game on a TV, or may be able to change between games on the TV, such as a gaming system as shown in FIGS. 2-6. A user may engage in gaming utilizing the system 10. This can be a standalone system or built into an existing system or overlay an existing system and may operate in one of the ways as described with regard to FIGS. 1A, 1B or the like. In particular embodiments, the server is 12 is programmed to perform certain steps and communicates directly with the user computing device 14 and either indirectly communicates with the TV 15 through the user computing device 14 as shown in FIG. 1A or communicates directly with the TV 15 as shown in FIG. 1B.

Figure 2:
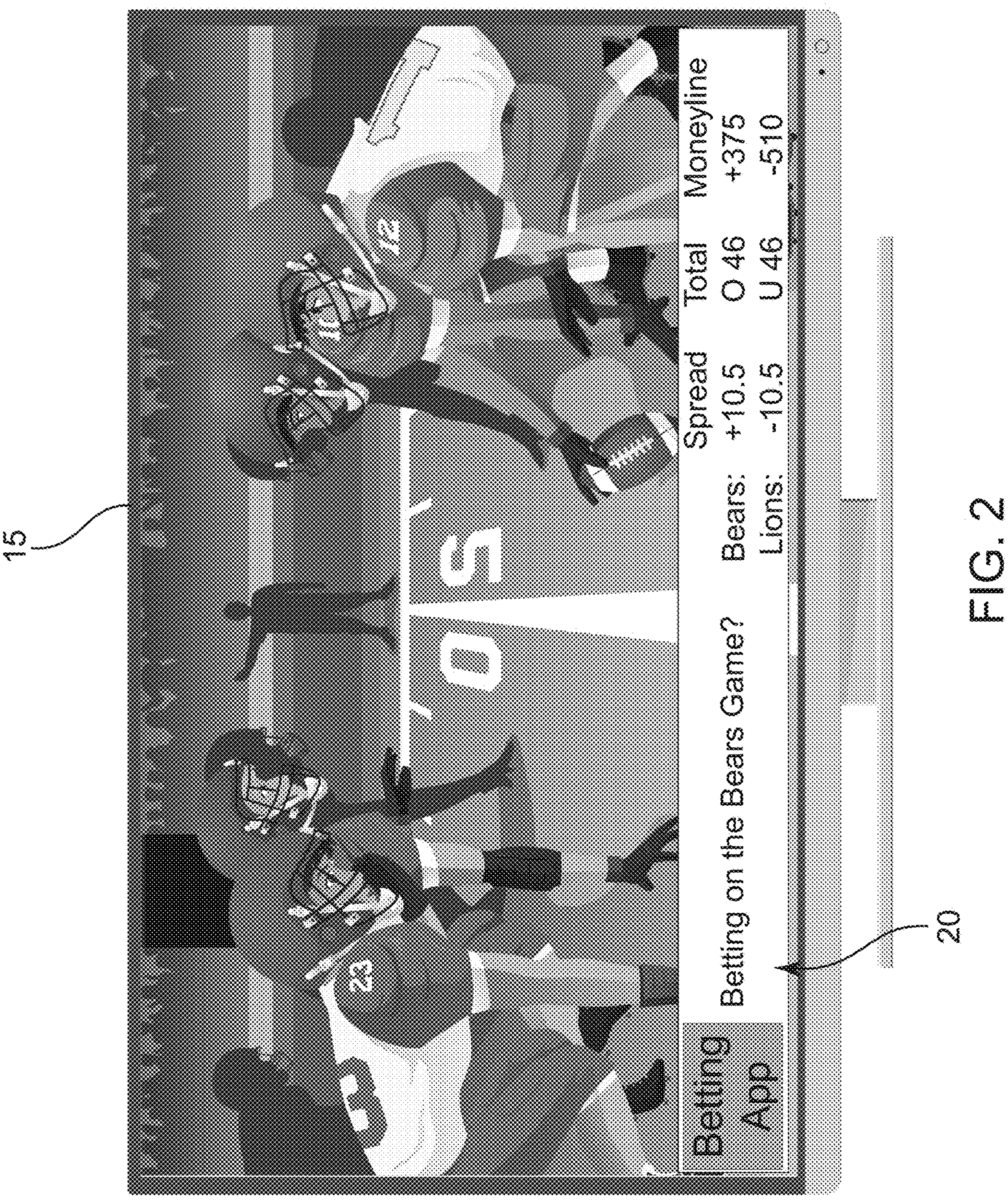
FIG. 2 depicts a gaming ticker system operating while watching a game on the TV according to an embodiment.
Figure 3:
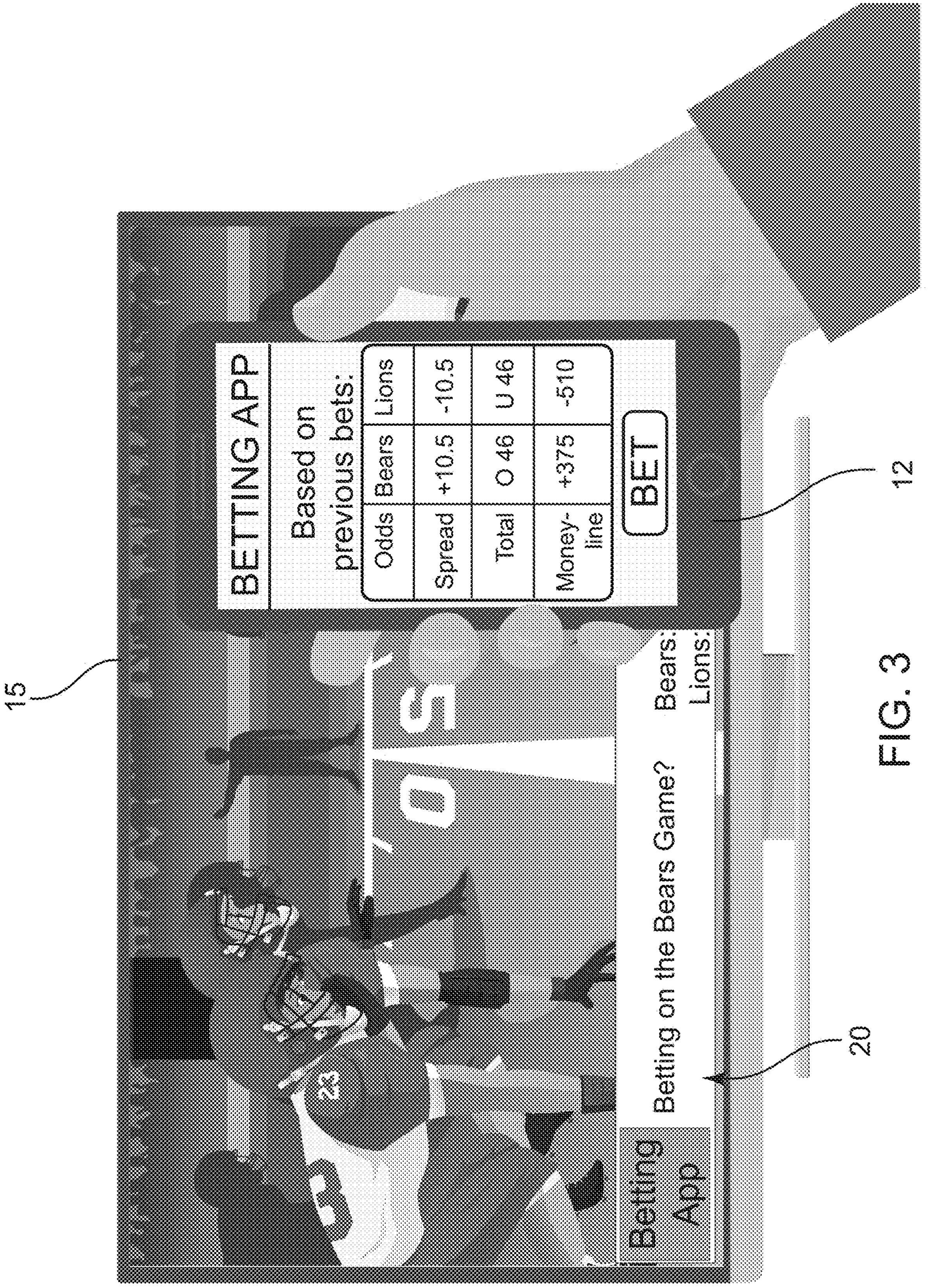
FIG. 3 depicts a gaming ticker system operating while watching a game on the TV according to an embodiment.

As shown in FIG. 2, the system 10 may operate to display information on a TV 15 that is tuned into watch a sporting event, such as a football game. A ticker 20 may be displayed on the TV 15, wherein the server 12 is programmed to send the ticker 20 for display on the TV 15. The system 10 operates, through programmed instructions on the server 12, to display information from the gaming system on the user computing device 12 and the TV 15 and further to display interaction between user and the gaming system 10. The system 10 may operate to access stored gaming history for the user on the server 12, such as teams the user bets on, the types of bets, and so forth. FIG. 2 depicts an instance when ticker 20 is displaying information for the gaming system, wherein in this example, the ticker 20 is displaying betting odds for a game and may further include an indication or directed betting advertisement to the user corresponding to the stored gaming history of the user on the server 12, in response to the server 12 analyzing the stored gaming history and sending for display on the TV 15 the betting odds and other information on the ticker 20. In FIG. 2 the ticker includes a request to the user to bet on a particular game and displays betting lines on the game. This directed advertisement and lines may correspond to the game displayed on the TV 15 or may be a game not being displayed and is upcoming. The system 10 further operates to allow users to engage in communication that is then pushed or displayed on the TV 15. FIG. 3 displays the user computing device 12 that has a betting interface that corresponds to the ticker 20 wherein the betting interface is related to the betting line of the game displayed on ticker 20 displayed on the TV 15. The user computing device 12 may be operated by a user to respond to the displayed gaming request on ticker 20, as shown in FIG. 3, such as placing a bet using the betting interface on the user computing device 14. The system 10, through programmed instructions on the server 14, operates to accept and enter the bet placed by the user utilizing user computing device 12.

Figure 4:
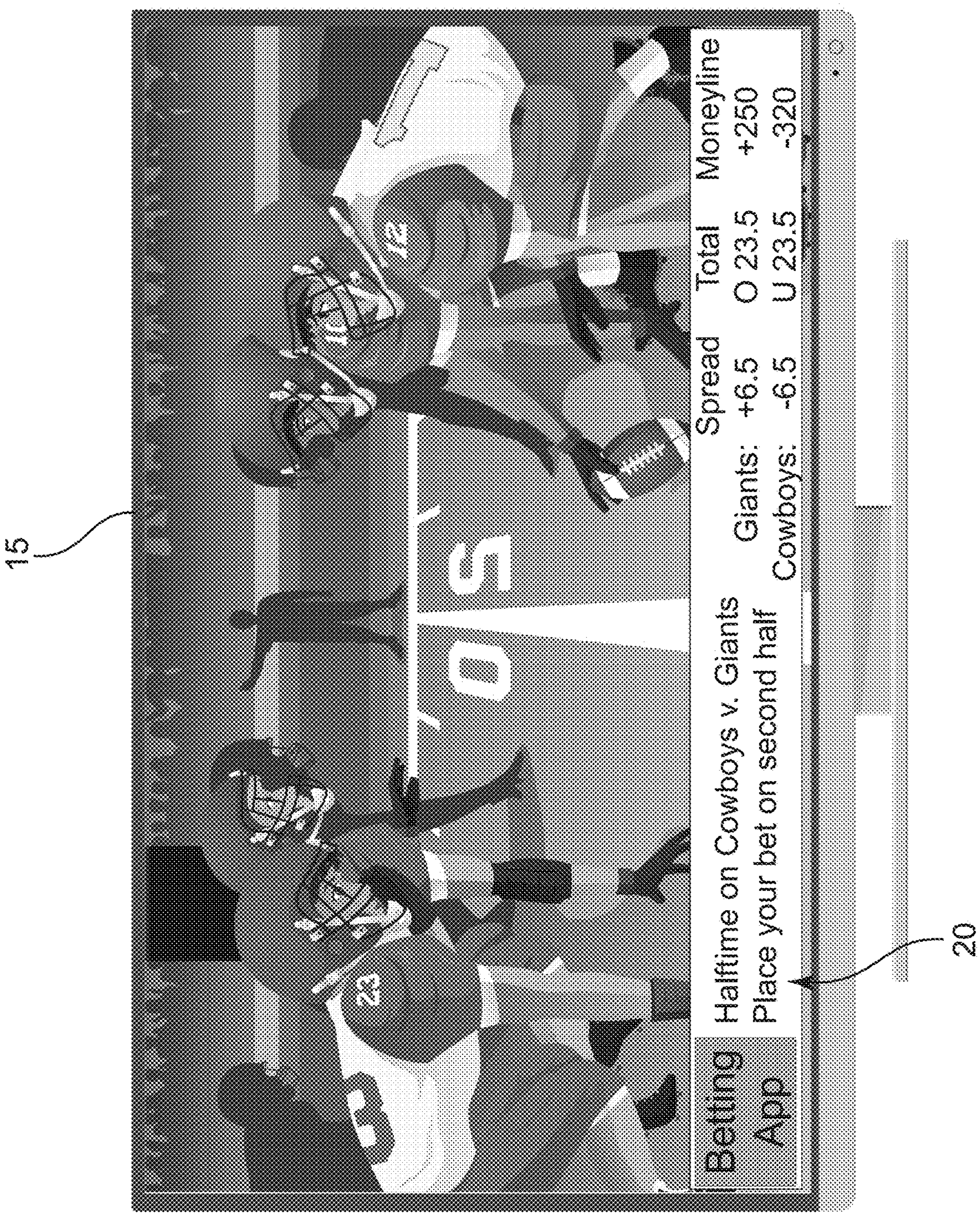
FIG. 4 depicts a gaming ticker system operating while watching a game on the TV according to an embodiment.
Figure 5:
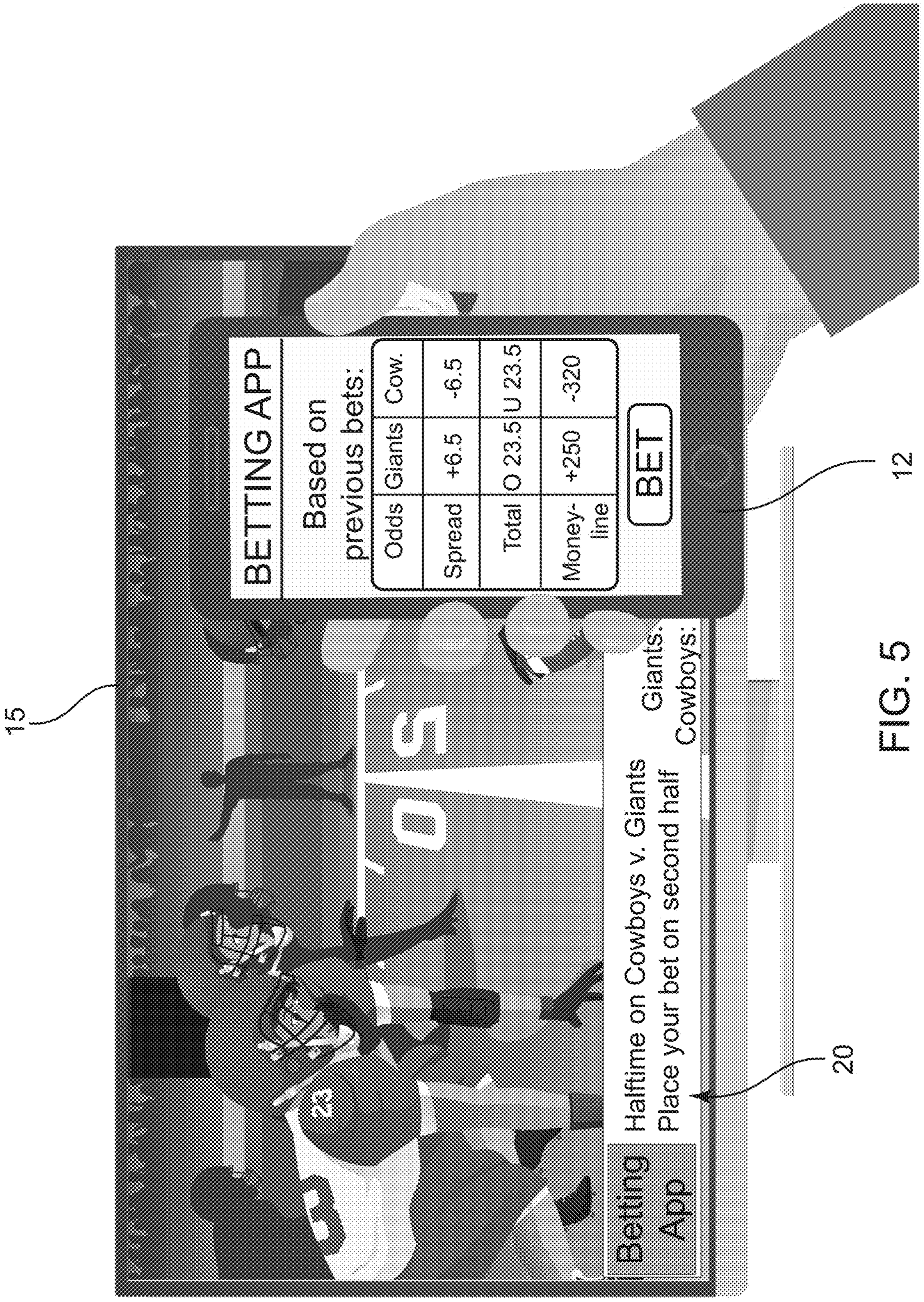
FIG. 5 depicts a gaming ticker system operating while watching a game on the TV according to an embodiment.

FIG. 4 depicts an instance when ticker 20 is displaying information for the gaming system, wherein in this example, the ticker 20 is displaying betting odds for a game that is at halftime and may further include an indication or directed betting advertisement to the user corresponding to the stored gaming history of the user stored in memory of the server 12, wherein the server 12 is programmed to analyze the stored gaming history and send the corresponding betting odds for a game at halftime for display on the ticker 20 on the TV 15. In FIG. 4 the ticker 20 includes a request to the user to bet on a particular game and displays betting lines on the game. This directed advertisement and lines may correspond to the game displayed on the TV 15 or may be a game not being displayed and is upcoming. The system 10 further operates to allow users to engage in communication that is then pushed or displayed on the TV 15. FIG. 5 displays the user computing device 12 that has a betting interface that corresponds to the ticker 20 wherein the betting interface is related to the betting line of the game displayed on ticker 20 displayed on the TV 15. The user computing device 12 may be operated by a user to respond to the displayed gaming request on ticker 20, as shown in FIG. 5, such as placing a bet using the betting interface on the user computing device 14. The system 10 operates to accept and enter the bet placed by the user utilizing user computing device 12.

Figure 6:
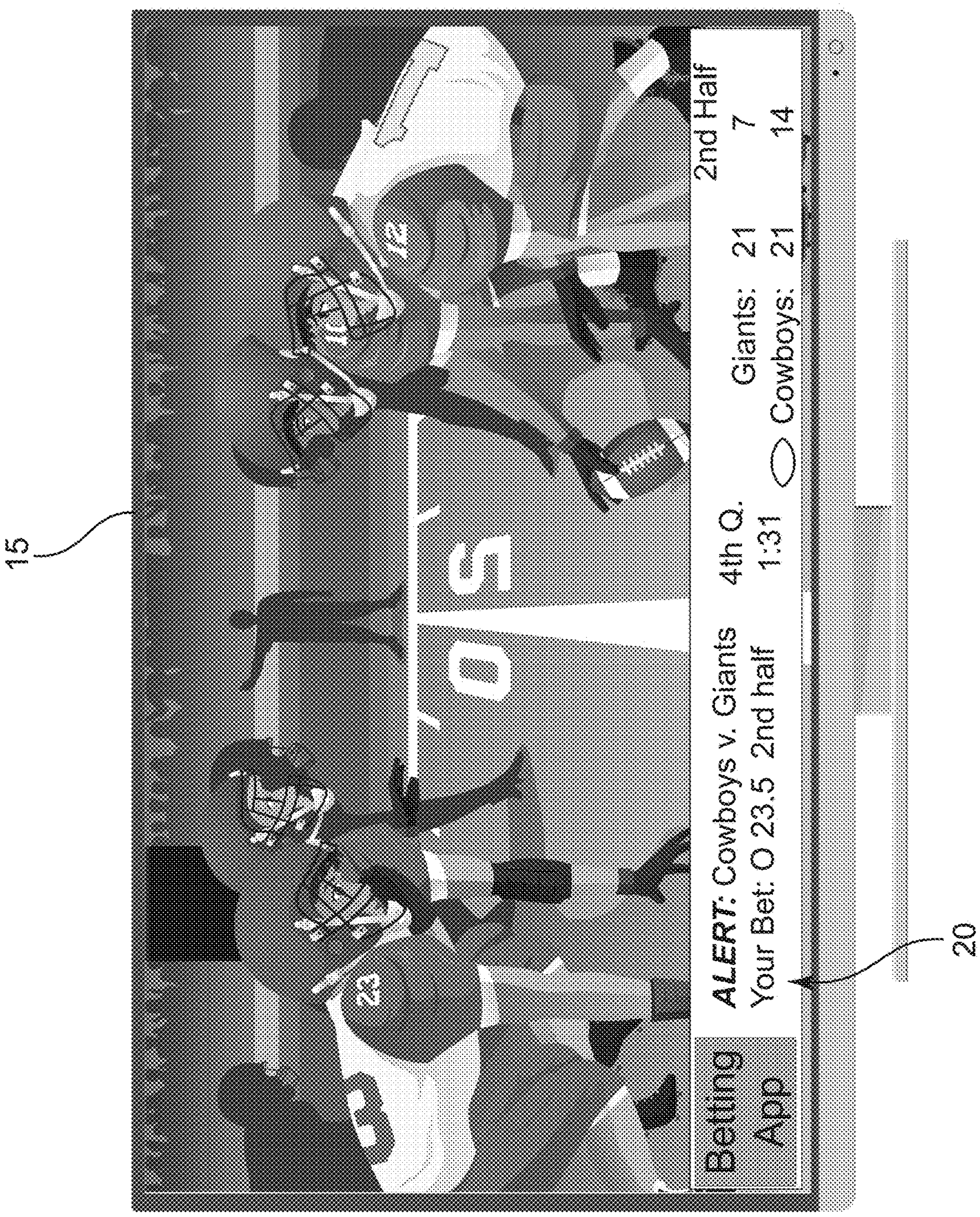
FIG. 6 depicts a gaming ticker system operating while watching a game on the TV according to an embodiment.

Referring the drawings, FIG. 6 depicts an instance when ticker 20 is displaying information for the gaming system 10, wherein in this example, the ticker 20 is displaying an alert related to a bet the user has placed, in response to the server 12 sending the alert for display on the ticker 20 on the TV 15. The alert may correspond to the game displayed on the TV 15 or may be a game not being displayed, thereby allowing the user to tune into the game corresponding to the bet and watch the event in real-time and cheer for his or her bet to be won. Other alerts and result may be displayed on the ticker 20 allowing the user to always see the bets he or she has placed, the odds on winning the bet, and so forth.

In embodiments, the server 12 may include learning software that can analyze the gaming behaviors of the user based on the stored bets in the server 12 memory. The learning software may be programmed to identify gaming patterns, typical wager types, typical wager amounts, favorite teams to bet on, interested divisions, sports bet on and so forth. The learning software may then be programmed to suggest or recommend bets, amounts, and so forth based on the historical gaming behaviors of the user and send for display on the TV 15 and on the user computing device 14.

With regard to all of these embodiments, it will be understood that engaging in the system 10 may require the anonymous collection of the geo-location of the user computing device 12 that is engaging in the system. This allows the aggregated input selections to be tied to a particular geo-location and the results can be filtered based on geo-location to, for example and without limitation, see who is engaging in the system from where, the particular geo-locations of users who reacted a certain way in polls for content being displayed on the TV and so forth.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for gaming interaction, the system comprising:

- a gaming server having a memory storing various sports betting data;
- a user computing device coupled to the server; and
- a TV coupled to the server, wherein the server is programmed to:
  - receive a signal that the user computing device and the TV have accessed the system and established a connection with the server;
  - send for display on the TV, a gaming ticker displaying betting odds for at least one sports game;
  - send for display on the user computing device, a betting interface corresponding to the betting odds displayed on the gaming ticker, the betting interface comprising input elements for placing a bet;

receiving a bet from the user computing device in response to selection of the input elements and storing the bet; and sending for display on the gaming ticker an alert related to the bet placed through the user computing device.

2. The system of claim 1, wherein the various sports betting data comprises at least one of betting odds, betting lines, games available to bet on.

3. The system of claim 1, wherein the various sports betting data comprises stored gaming history of a user operating the user computing device.

4. The system of claim 3, wherein the gaming ticker displaying betting odds comprises a directed betting advertisement corresponding to the stored gaming history of the user on the server, in response to the server analyzing the stored gaming history and sending for display on the betting odds and other information on the ticker corresponding to the stored gaming history of the user.

5. The system of claim 4, wherein the server is further programmed with learning software to analyze the gaming behaviors of the user based on the stored gaming history of the user.

6. The system of claim 5, wherein the server operating the learning software is programmed to identify gaming patterns, typical wager types, typical wager amounts, favorite teams to bet on, interested divisions, sports bet on and combinations thereof by the user.

7. The system of claim 6, wherein the server, operating the learning software, is programmed to suggest or recommend bets and amounts to the user computing device as displayed on the betting interface of the user computing device.

* * * * *